United States Patent [19]

Ettischer

[11] 4,268,149
[45] May 19, 1981

[54] LATCH FOR COLLAPSIBLE PHOTOGRAPHIC CAMERA

[75] Inventor: Helmut Ettischer, Ostfildern, Fed. Rep. of Germany

[73] Assignee: Eastman Kodak Company, Rochester, N.Y.

[21] Appl. No.: 154,711

[22] Filed: May 30, 1980

[30] Foreign Application Priority Data

Jun. 2, 1979 [DE] Fed. Rep. of Germany ... 7916012[U]

[51] Int. Cl.³ .............................................. G03B 17/04
[52] U.S. Cl. .................................................... 354/187
[58] Field of Search ...................... 354/187, 191, 288; 312/333; 403/325, 330; 24/230 AP

[56] References Cited

U.S. PATENT DOCUMENTS

| 524,142 | 8/1894 | Hegelein | 354/187 |
|---|---|---|---|
| 1,061,115 | 5/1913 | Pickard | 354/187 |
| 1,631,301 | 6/1927 | Washington | 354/187 |
| 1,663,377 | 3/1928 | Knaster | 312/333 X |
| 2,109,807 | 3/1938 | Tajima | 354/187 |
| 2,126,300 | 8/1938 | Wittel | 354/191 |
| 2,126,312 | 8/1938 | Crumrine | 354/191 |
| 2,208,799 | 7/1940 | Lessler et al. | 354/187 |
| 2,865,273 | 12/1958 | Meixner et al. | 354/187 |
| 3,418,907 | 12/1968 | Bellows | 354/187 |
| 3,665,832 | 5/1972 | Harvey | 354/187 |
| 3,668,992 | 6/1972 | Harvey | 354/187 |
| 3,672,280 | 6/1972 | Imura | 354/191 |
| 3,712,198 | 1/1973 | Nerwin | 354/187 X |

FOREIGN PATENT DOCUMENTS

| 1215544 | 9/1931 | Fed. Rep. of Germany | 354/187 |
|---|---|---|---|
| 802038 | 2/1951 | Fed. Rep. of Germany | 354/187 |
| 904729 | 2/1954 | Fed. Rep. of Germany | 354/187 |

*Primary Examiner*—Donald A. Griffin
*Attorney, Agent, or Firm*—N. Rushefsky

[57] ABSTRACT

A photographic camera includes a collapsible lens carrier, formed of at least two movable tubular members, that may be telescoped into a third tubular member rigidly secured to a camera body portion. An improved latch secures the lens carrier in an extended position. The latch comprises a two armed lever pivotally supported on one of the movable tubular members. When the carrier is extended a spring associated with the latch urges an end of one arm against a frontwardly facing surface of the third tubular member and urges an end of a second arm against a rearwardly facing surface of the other movable tubular members thereby latching the carrier in its extended position. A portion of the lever extends through an opening in the carrier to permit this lever to be manually pivoted out of its latching position thus permitting the operator to collapse the carrier.

5 Claims, 2 Drawing Figures

LATCH FOR COLLAPSIBLE PHOTOGRAPHIC CAMERA

BACKGROUND OF THE INVENTION

1. Field of the Invention

The present invention relates to photography and more particularly to an improved latch for maintaining collapsible portions of a camera in an extended position suitable for picture taking.

2. Description of the Prior Art

In recent years, self-processing cameras have become very popular among amateur photographers. For reasons well known to those skilled in the photographic art, such cameras necessarily require large format film and dictate the use of relatively long focal length lenses in order to provide reasonably large finished prints. Accordingly, self-processing cameras are often of the folding or collapsible type which was common among conventional cameras at the time when the formats of most films for amateur cameras were relatively large. One type of camera well known in the art is that which may be referred to as a collapsible tubular camera. Examples are described in U.S. Pat. Nos. 524,142; 1,061,115; 1,631,301; 3,668,992 and German Pat. No. 802,038 and German Gebrauchsmuster No. 1,215,544. In the cameras described in these patents a lens carrier is comprised of at least two tubular telescoping members, the forwardmost of which supports the camera's taking lens. When the camera is not in use the members may be telescoped into a tubular housing that is rigidly attached to the camera to form a more compact camera and facilitate its storage or carrying. To erect the camera the tubular members are moved to their extended positions. The prior art has recognized the importance of maintaining the camera fully erect to ensure that the lens is suitably positioned for focusing. To this end the prior art, as exemplified above, suggests that telescopic members in a camera may be maintained in their extended positions by the frictional relationship of interconnected tapered tubular members or by separate latches which are associated respectively with each pair of interconnected members.

SUMMARY OF THE INVENTION

It is an object of my invention to provide a simplified and improved latch for a collapsible camera, which permits the erecting and collapsing thereof, employing a mechanism with which two interconnected extendable tube members can be securely locked and, when desired, be released from their locked positions.

The above and other objects are achieved in a camera of the aforementioned type by a spring-biased two-armed lever that is mounted on one of a pair of interconnected movable tubular members, which members together comprise a lens carrier. In its locking position the lever is positioned such that one arm thereof rests against a forwardly facing surface of a third tubular member that is rigidly connected to a body portion of the camera and supports the lens carrier. A second arm of the lever rests against a rearwardly facing surface on the other movable tubular member to secure the lens carrier in its extended position.

As used herein the terms forward(ly) and rearward(ly) relate respectively to directions away from and towards the film supporting portion of the camera.

For a fuller understanding of the nature and object of my invention, reference should be made to the following detailed description taken in conjunction with the accompanying drawings wherein:

DESCRIPTION OF THE PREFERRED EMBODIMENT

Because photographic cameras for film units of the self-processing type are well known, the present description will be directed to elements forming part of or cooperating more directly with the present invention which relates to an improved latch for a collapsible camera. Apparatus and film elements not specifically shown or described herein are selectable from those known in the prior art.

Figure 1:
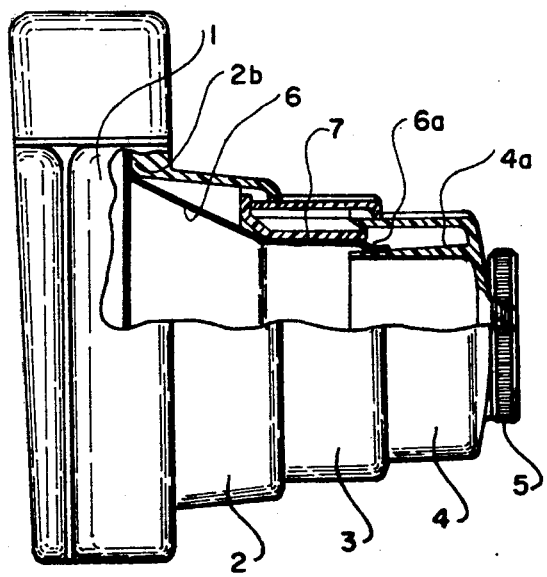
FIG. 1 is a side elevational view, partially in section, of a self-processing camera of the type suitable for using the improved latch of my invention.
Figure 2:
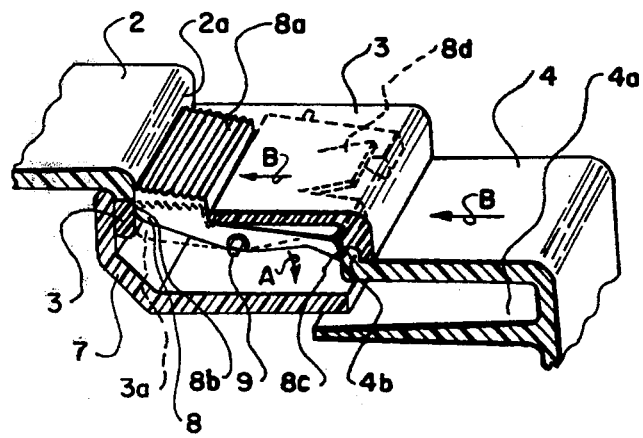
FIG. 2 is a perspective view partially in section of an improved latch which comprises a preferred embodiment of my invention.

With reference now to the drawings, the camera shown in FIG. 1 comprises a body portion 1 that is provided with suitable structure and mechanism (not shown) for supporting a cartridge of photographic film units, with a foremost film unit in the cartridge being located in a focal plane for exposure to light imaged thereon. The body portion may also include suitable structure for transporting and initiating processing of film units after their respective exposures. A housing tube 2 is rigidly and immovably connected with the camera body 1. Two interconnected rigid tubular members 3 and 4, together comprising a lens carrier, are supported by this housing tube and can be telescoped from their respective erected positions shown into their respective collapsed positions (not shown) wherein the camera is more compact. The front tube member 4 supports at a forward end thereof the taking or objective lens 5 and exposure control members (not shown). A bellows 6, serving as a light seal, is fixed to a rear circumferential edge 2b of the housing tube 2 and to an inner wall 7 of the intermediate tube member 3. The bellows 6 further has a sealing lip 6a which contacts an inner wall 4a of the front tube member 4. The housing tube 2 and the movable tube members 3 and 4 are rectangular in cross-section with rounded longitudinal edges. Both members 3 and 4 have respective inner and outer walls. With reference now to FIG. 2, the improved latching mechanism for maintaining the movable tube members in their respective extended positions comprises a lever 8 on which two oppositely directed pins 9 are integrally formed and which support the lever for pivotal movement on the intermediate tube member 3. Although only one lever is shown in FIG. 2 it would be desirable to provide two oppositely disposed levers 8 on tube member 3.

The lever 8 rests with an end 8b of one arm thereof against a forwardly facing surface 2a formed on housing tube 2. An end 8c of another arm of the lever rests against a rearwardly facing surface 4b of the front tube member 4, when the tube portions 3 and 4 are in their respective extended positions. The ends of the lever are designed as slightly curved locking surfaces. In this position the lever 8 locks both tube members 3 and 4 with the housing tube 2. All three tube members then form one rigid unit. Further, the lever 8 when in this position, has a manually accessible portion 8a thereof which extends through an opening 3a in the tube member 3 to the exterior. This portion is accessible to a camera operator and is arranged adjacent to the locking end surface 8b.

A spring flap 8d is integrally formed in the area of the locking end surface 8c of the lever 8 and through engagement with the underside of the outer wall of members 3 biases the lever for pivoting movement about pins 9 into its latching position or in the direction of the arrow "A".

When disengaging the locking surfaces, the manually accessible portion 8a, being freely movable through opening 3a, is pressed by the operator fully through this opening. This will cause lever 8 to be slightly pivoted. In so doing, its locking surface 8b slides from the front surface 2a of the housing tube 2 and its other locking surface slides from the rear end surface 4b of the front tube portion 4 and both tube portions 3 and 4 can be telescoped in the direction of arrow "B" into the housing tube 2 so that the camera is made more compact.

Thus it will be appreciated that an improved latching mechanism has been described which is well suited for latching a lens carrier formed of two interconnected movable members in their respective extended positions without the need for providing separate latching devices for each movable member.

The invention has been described in detail with particular reference to a preferred embodiment thereof, but it will be understood that variations and modifications can be effected within the spirit and scope of the invention.

I claim:

1. In a photographic camera including a camera body portion for supporting photographic film in an exposure plane; a first tubular member fixed to the camera body; a movable lens carrier supporting a taking lens and supported by the fixed member and comprising two interconnected tubular members telescopically movable from respective forward extended positions wherein the lens may be positioned to form an image in the exposure plane, to respective rearward collapsed positions wherein the camera is more compact, one of the two interconnected members comprising an intermediate tubular member supported by the fixed tubular member, and the other a front tubular member supported by the intermediate member, the improvement comprising:

means for latching the interconnected members in their extended positions, including a two armed lever supported on the intermediate member and positionable in a latching position wherein one arm of the lever rests against a frontwardly facing surface of the fixed tubular member and the other arm of the lever rests against a rearwardly facing surface of the front tubular member to secure the lens carrier in its extended position; and spring means for urging the lever into its latching position.

2. The camera of claim 1 wherein the lever is supported on the intermediate tubular lever for pivotal movement and the ends of the lever have slightly curved end surfaces which are urged into latching positions by the spring means.

3. The camera of claims 1 or 2 wherein the intermediate tubular member includes an opening and wherein the lever is supported so that a manually accessible portion thereof is accessible to a camera operator by this opening.

4. The camera of claim 3 wherein the manually accessible portion is freely passable through this opening.

5. The camera of claim 4 and wherein the lever may be pivoted from its latching position to a position wherein the arms of the lever are removed from latching relationship with the fixed and front tubular members to permit the front and intermediate tubular members to be telescoped to make the camera more compact.

* * * * *